R. M. KEMP.
PLOW.
APPLICATION FILED SEPT. 29, 1908.
971,448.
Patented Sept. 27, 1910.
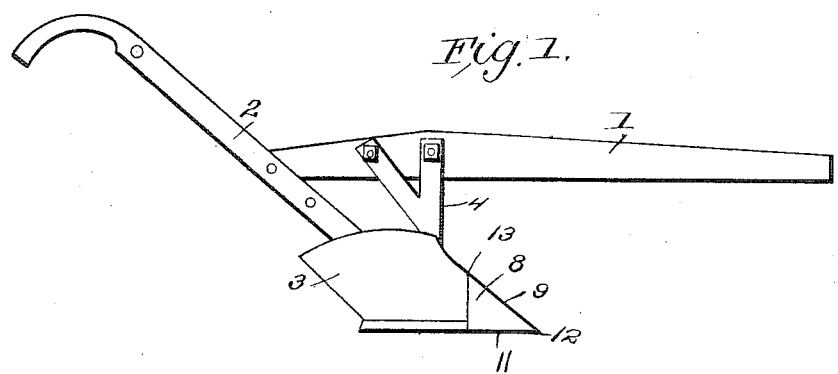
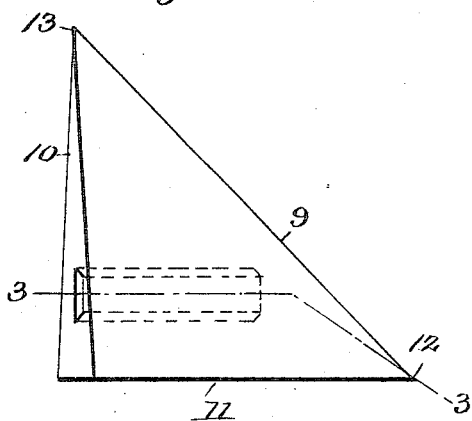
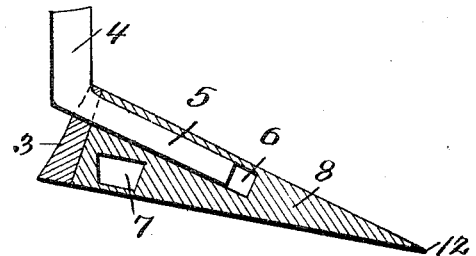
Inventor
Randolph M. Kemp
Witnesses
E. Cloud Newman.
R. S. Trogner.
By Mason Fenwick Lawrence
Attorneys

UNITED STATES PATENT OFFICE.

RANDOLPH MEREDITH KEMP, OF DURHAM OX, NEAR PYRAMID HILL, VICTORIA, AUSTRALIA.

PLOW.

971,448.  Specification of Letters Patent.  Patented Sept. 27, 1910.

Application filed September 29, 1908. Serial No. 455,379.

*To all whom it may concern:*

Be it known that I, RANDOLPH MEREDITH KEMP, a subject of the King of Great Britain and Ireland, residing at Durham Ox, near Pyramid Hill, on the Serpentine Creek, in the county of Gunbower, State of Victoria, Commonwealth of Australia, farmer, have invented a certain new and useful Improved Plow, of which the following is a specification.

The object of this invention is to provide a combined implement which makes a cut into the ground ready for the share, allows for shallower plowing or a cut of less depth with the share, agitates the sub soil of each furrow without bringing it to the surface and harrows or breaks up the furrow clods as they are turned over by the moldboard.

Referring to the drawings which form a part of this specification—Figure 1 is a view in side elevation of a plow with the improved share of the present invention applied thereto: Fig. 2 is a perspective view of a double service over-turnable share. Fig. 3 is a section taken through the line 3—3 of Fig. 2.

Referring to the drawings, 1 designates generally the beam of an ordinary plow, 2 the handles and 3 the moldboard, and as these parts may be of the usual and any preferred construction, a detailed description thereof is deemed unnecessary.

Secured to the beam is a standard 4 having at its lower end downwardly inclined extension 5 designed to engage with either of a pair of sockets 6 and 7 arranged within the share 8 and disposed at right angles to each other. These sockets are so formed that the incline between the share and the extension 5 will be of the most suitable character and at the same time permit the share to be removed when it is desired to change its cutting qualities. The opposite walls of the sockets are inclined toward each other in the manner shown in Fig. 3.

As shown in Fig. 2, the share is of approximately a triangular wedge shape, the hypotenuse of which forms a furrow edge 9, one side a back edge 10 and the other side an edge 11. The share is further provided with a share point 12 and with a wing point 13.

As will be seen by reference to Fig. 2, the sockets extend in a direction parallel with the sides of the triangle and have the sides converging toward the wing and share points.

From the arrangement shown and by the employment of the slots it will be seen that the share may readily be removed and reversed according to whether shallow or deep plowing be desired.

Having thus fully described the invention what I claim is:

1. In a plow, a share approximately the form of a wedge shaped triangle, the hypotenuse forming a furrow edge 9, one side and back edge 10, and the other side an edge 11, the share being provided with two sockets disposed at right angles to each other, to render the share reversible.

2. In a plow, a share having a share point 12, a wing point 13, an edge 10, and an edge 11, said share having sockets adjacent to the edges 10 and 11 and disposed at right angles to each other, each socket having undercut side walls.

3. In a plow, a share of triangular wedge shape, the hypotenuse forming a furrow edge 9, one side and back edge 10 and the other side an edge 11, the share being provided with sockets adjacent to the edges 10 and 11 and extending in a direction parallel with the sides of the triangle, the side walls of the sockets converging toward the wing and share points, and a bracket having an angular extension to engage either of the sockets, to render the share reversible.

In testimony whereof I affix my signature in the presence of two subscribing witnesses.

RANDOLPH MEREDITH KEMP.

Witnesses:
EDWIN PHILLIPS,
CECIL N. LE PLASTRIER.